United States Patent
Gadupudi et al.

(10) Patent No.: US 12,536,026 B2
(45) Date of Patent: Jan. 27, 2026

(54) SIMULATION OF ONE OR MORE PIPELINE JOBS IN A SOFTWARE DEPLOYMENT PIPELINE

(71) Applicant: Dell Products L.P., Round Rock, TX (US)

(72) Inventors: Mohan Rao Gadupudi, Hyderabad (IN); Avinash Gopisetti Venkata, Bengaluru (IN); Afsar Doodekula, Kurnool (IN); Rajeev Patil, Bangalore (IN); Sagar Sanjeev, Patna (IN); Venkata Chowdary Mutyala, Miyapur-Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 75 days.

(21) Appl. No.: 18/077,761

(22) Filed: Dec. 8, 2022

(65) Prior Publication Data
US 2024/0192974 A1 Jun. 13, 2024

(51) Int. Cl.
*G06F 30/33* (2020.01)
*G06F 3/04842* (2022.01)
(Continued)

(52) U.S. Cl.
CPC .......... *G06F 9/455* (2013.01); *G06F 3/04842* (2013.01); *G06F 8/60* (2013.01);
(Continued)

(58) Field of Classification Search
CPC ...... G06F 9/544; G06F 9/45504; G06F 9/445; G06F 9/455; G06F 3/04842; G06F 8/60; G06F 11/362
See application file for complete search history.

(56) References Cited

U.S. PATENT DOCUMENTS

| | | | |
|---|---|---|---|
| 2019/0042289 A1* | 2/2019 | Bailey | G06F 9/45504 |
| 2019/0303119 A1* | 10/2019 | Atkinson | G06F 9/544 |
| 2024/0078101 A1* | 3/2024 | Hykes | G06F 9/445 |

OTHER PUBLICATIONS

KR 101645052, (translation), Aug. 2, 2016, 17 pgs <KR_101645052.pdf>.*

(Continued)

*Primary Examiner* — Tuan A Vu
(74) *Attorney, Agent, or Firm* — Ryan, Mason & Lewis, LLP

(57) ABSTRACT

Techniques are provided for simulation of pipeline jobs in a software deployment pipeline. One method comprises obtaining a request from a user to simulate a pipeline job of a software deployment pipeline; processing a configuration file associated with the pipeline job to identify an image for a virtualized computing resource associated with the pipeline job; generating an executable script for the pipeline job using the configuration file associated with the pipeline job; initiating a generation of a simulated version of the virtualized computing resource in a simulated environment using the image for the virtualized computing resource associated with the pipeline job; initiating an execution of at least a portion of the pipeline job in the simulated version of the virtualized computing resource; and obtaining one or more results from the execution of the at least one pipeline job in the simulated version of the virtualized computing resource.

20 Claims, 11 Drawing Sheets

(51) Int. Cl.
*G06F 8/60* (2018.01)
*G06F 9/445* (2018.01)
*G06F 9/455* (2018.01)
*G06F 9/54* (2006.01)
*G06F 11/362* (2025.01)

(52) U.S. Cl.
CPC .......... *G06F 9/445* (2013.01); *G06F 9/45504* (2013.01); *G06F 9/544* (2013.01); *G06F 11/362* (2013.01)

(56) References Cited

OTHER PUBLICATIONS

Hao et al., CN 111813379A (translation), Oct. 23, 2020, 14 pgs <CN_111813379A.pdf>.*

"A Solution Blueprint for DevOps"; www.Spirent.com; downloaded on Aug. 31, 2022.
"Graphical User Interface Examples"; https://www.conceptdraw.com/How-To-Guide/graphical-user-interface-example; downloaded on Sep. 6, 2022.
"Your Product-Led Experience Builder"; https://www.candu.ai/enterprise?utm_source=google&utm_medium=cpc&utm_campaign=primary_keywords&utm_term=ui%20builder&utm_content=enterprise_page&gclid=Cj0KCQjwjbyYBhCdARIsAArC6LJjfzlqOYhkB-Sz0_ZJuewQ_W1QiE1jN84VieG9V_c-6xsU4thwecaArYoEALw_wcB; downloaded on Aug. 31, 2022.
Chitalov, Dmitri I; "Development of an Application with a Graphical User Interface (GUI) to Compute in Parallel in the OpenFOAM Environment"; https://iopscience.iop.org/article/10.1088/1742-6596/1399/3/033001; downloaded on Aug. 31, 2022.
U.S. Appl. No. 17/940,457 entitled "Visual Generation of Software Deployment Pipelines Using Recommendations of Development and Operations Blueprints", filed Sep. 8, 2022.

* cited by examiner

```
compile-package:
  stage: build
  extends: .compile-package-js
  image: nodejs-devops:10-lts_v2.0.0
  before_script:
    - npm install
    - npm uninstall -g karma-chrome-launcher
    - npm install -g karma-chrome-launcher@3.1.0
  script:
    - npm install
  after_script:
    - echo "Job Completed"
```

```
# Downloads Code to Container
#!/bin.bash

#Loads dependencies based on before_script
npm install
npm uninstall -g karma-chrome-launcher
npm install -g karma-chrome-launcher@3.1.0

#Script
npm run build

#After Script
echo "Job Completed"
```

SIMULATION OF ONE OR MORE PIPELINE JOBS IN A SOFTWARE DEPLOYMENT PIPELINE

FIELD

The field relates generally to information processing systems and more particularly, to software development techniques in such systems.

BACKGROUND

A number of techniques exist for developing and making changes to software code. GitHub, for example, provides a software development platform that enables communication and collaboration among software developers. The software development platform provided by GitHub allows software developers to create new versions of software without disrupting a current version. Software development tasks often require testing and correction (sometimes referred to as debugging) of one or more software jobs of a software development project.

SUMMARY

In one embodiment, a method comprises obtaining a request from a user to simulate at least one pipeline job in one or more pipeline stages of a software deployment pipeline; processing a configuration file associated with the at least one pipeline job to identify an image for at least one virtualized computing resource associated with the at least one pipeline job; generating an executable script for the at least one pipeline job using the configuration file associated with the at least one pipeline job; initiating a generation of a simulated version of the at least one virtualized computing resource in a simulated environment using the image for the at least one virtualized computing resource associated with the at least one pipeline job; initiating an execution of at least a portion of the at least one pipeline job in the simulated version of the at least one virtualized computing resource; and obtaining one or more results from the execution of the at least one pipeline job in the simulated version of the at least one virtualized computing resource.

In one or more embodiments, a graphical user interface is provided to present a visual representation of at least some of the at least one pipeline job in the one or more pipeline stages of the software deployment pipeline to the user for selection of a given pipeline job to simulate. The configuration file associated with the at least one pipeline job may be processed to identify one or more software dependencies for an execution of the at least one pipeline job; and the one or more identified software dependencies for the execution of the at least one pipeline job may be installed in the simulated version of the at least one virtualized computing resource using the executable script.

In some embodiments, a debugging of at least a portion of the at least one pipeline job using the one or more results from the execution of the at least one pipeline job is initiated. The execution of the at least the portion of the at least one pipeline job in the simulated version of the at least one virtualized computing resource may comprise executing the at least one pipeline job in its entirety and/or executing one or more indicated lines of the at least one pipeline job. In addition, an interactive terminal may be provided for the user to interact with the execution of the at least the portion of the at least one pipeline job in the simulated version of the at least one virtualized computing resource. One or more designated breakpoints in the at least one pipeline job may be processed to halt the execution of at least one pipeline job.

Other illustrative embodiments include, without limitation, apparatus, systems, methods and computer program products comprising processor-readable storage media.

BRIEF DESCRIPTION OF THE DRAWINGS

FIGS. 6A and 6B show examples of a pipeline job and a corresponding executable script, respectively, in accordance with illustrative embodiments;

DETAILED DESCRIPTION

Figure 1:
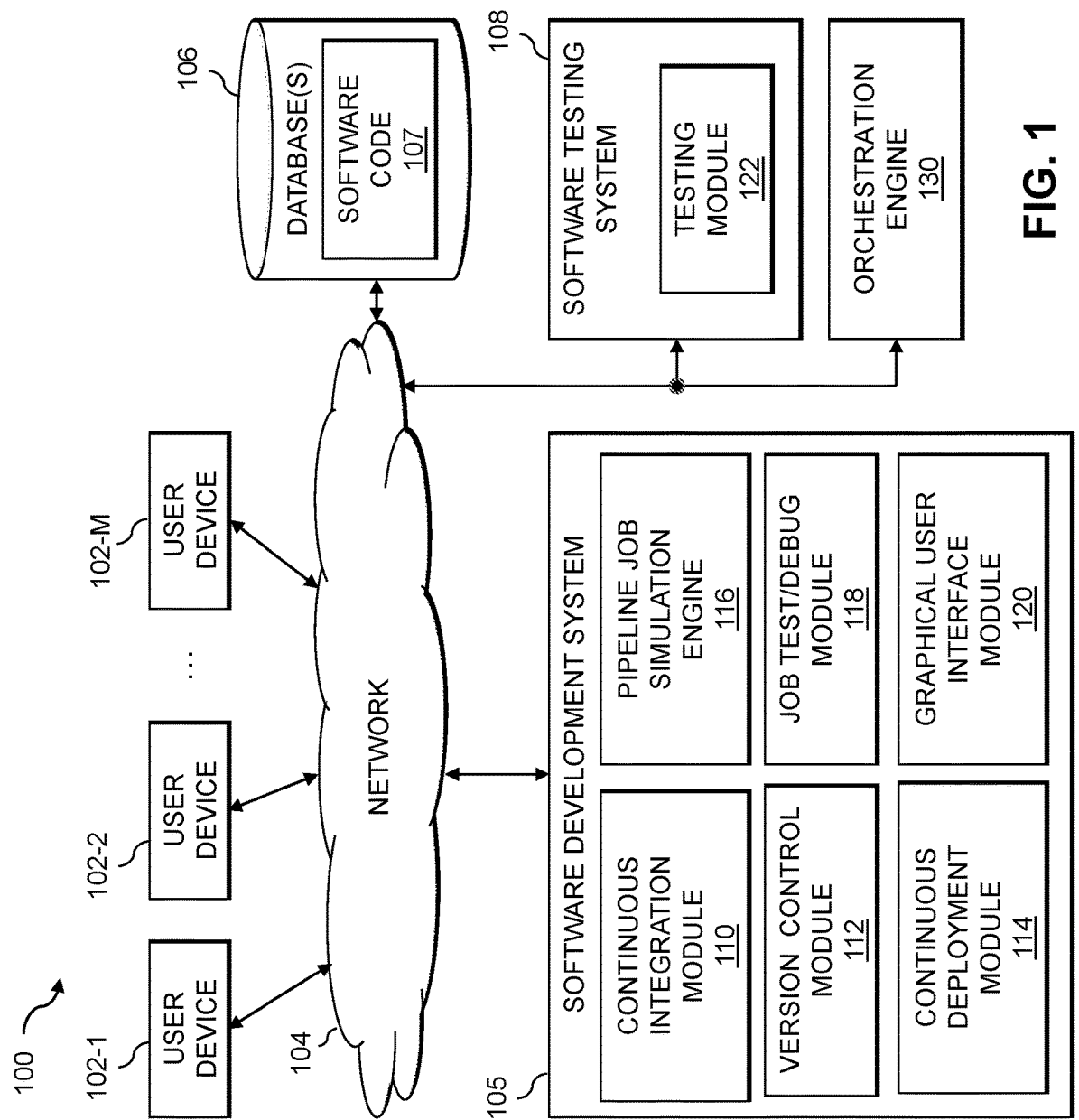
FIG. 1 illustrates an information processing system configured for simulation of one or more pipeline jobs in a software deployment pipeline, in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for simulation of one or more pipeline jobs in a software deployment pipeline.

The term DevOps generally refers to a set of practices that combines software development and information technology (IT) operations. DevOps are increasingly being used to shorten the software development lifecycle and to provide continuous integration, continuous delivery, and continuous deployment. Continuous integration (CI) generally allows development teams to merge and verify changes more often by automating software generation (e.g., converting source code files into standalone software components that can be executed on a computing device) and software tests, so that errors can be detected and resolved early. Continuous delivery extends continuous integration and includes efficiently and safely deploying the changes into testing and production environments. Continuous deployment (CD) allows code changes that pass an automated testing phase to be automatically released into the production environment, thus making the changes visible to end users. Such processes are typically executed within a software generation and deployment pipeline.

DevOps solutions typically employ blueprints that encompass continuous integration, continuous testing (CT), continuous deployment (also referred to as continuous development) and/or continuous change and management (CCM) abilities. DevOps blueprints allow development teams to efficiently innovate by automating workflows for a software development and delivery lifecycle. A typical software development lifecycle is discussed further below in conjunction with FIG. 2A.

A software deployment pipeline (sometimes referred to as a CI/CD pipeline) automates a software delivery process, and typically comprises a set of automated processes and tools that allow developers and an operations team to work together to generate and deploy application software code to a production environment. A preconfigured software deployment pipeline may comprise a specified set of elements and/or environments. Such elements and/or environments may be added or removed from the software deployment pipeline, for example, based at least in part on the software and/or compliance requirements. A software deployment pipeline typically comprises one or more quality control gates to ensure that software code does not get released to a production environment without satisfying a number of predefined testing and/or quality requirements. For example, a quality control gate may specify that software code should compile without errors and that all unit tests and functional user interface tests must pass.

One or more aspects of the disclosure recognize that bottlenecks in a CI/CD pipeline may arise from a misconfiguration of the CI/CD pipeline (e.g., an inadequate level of automation, inappropriate agent characteristics, and/or a suboptimal queuing strategy). In addition, developers do not currently have a way to test and debug CI/CD pipelines or to perform unit testing at the time such CI/CD pipelines are designed. Testing and debugging are important activities during CI/CD pipeline creation and maintenance. Testing is performed to determine whether the job script contains any errors, while debugging is performed to locate and fix any detected errors. Unit testing of the CI/CD pipeline is one challenge faced by developers, as there is no mechanism to determine whether a given pipeline job or script passes or fails at design time.

In one or more embodiments, the disclosed techniques for simulation of one or more pipeline jobs of a CI/CD pipeline allow portions of the settings of the CI/CD pipeline to be analyzed and improved. For example, one or more selected pipeline jobs from a given software deployment pipeline may be simulated (e.g., on a per-job basis) in a simulated environment to evaluate how the one or more selected pipeline jobs will execute in a run-time environment, such as a Git-based DevOps and/or CI/CD execution environment. In this manner, the disclosed simulation techniques provide a testing environment to improve a variety of factors that may affect performance of the CI/CD pipeline.

In at least some embodiments, the disclosed simulation techniques provide an interactive terminal (e.g., a bash terminal on a user display that provides a command-line interface shell program) to execute the one or more selected pipeline jobs and to obtain real-time results. The user can use the interactive terminal to issue job commands and obtain feedback. A user may optionally specify one or more breakpoints in a given simulated pipeline job to pause and evaluate the execution. In this manner, the user can examine the values of variables, and step through execution of a given job script, e.g., line-by-line.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 may be employed, for example, by software developers and other DevOps professionals to perform, for example, software development and/or software deployment tasks. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a software development system 105, a software testing system 108 and an orchestration engine 130.

The user devices 102 may comprise, for example, devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The software development system 105 comprises a continuous integration module 110, a version control module 112, a continuous deployment module 114, a pipeline job simulation engine 116, a job test/debug module 118 and a graphical user interface (GUI) module 120. Exemplary processes utilizing elements 110, 112, 114, 116, 118 and/or 120 will be described in more detail with reference to, for example, the flow diagrams of FIGS. 2A, 4, 8 and 9.

In at least some embodiments, the continuous integration module 110, the version control module 112 and/or the continuous deployment module 114, or portions thereof, may be implemented using functionality provided, for example, by commercially available DevOps and/or CI/CD tools, such as the GitLab development platform, the GitHub development platform, the Azure DevOps server and/or the Bitbucket CI/CD tool, or another Git-based DevOps and/or CI/CD tool. The continuous integration module 110, the version control module 112 and the continuous deployment module 114 may be configured, for example, to perform CI/CD tasks and to provide access to DevOps tools and/or repositories. The continuous integration module 110 provides functionality for automating the integration of software code changes from multiple software developers or other DevOps professionals into a single software project.

In one or more embodiments, the version control module 112 manages canonical schemas (e.g., blueprints, job templates, and software scripts for jobs) and other aspects of the repository composition available from the DevOps and/or CI/CD tool. Source code management (SCM) techniques may be used to track modifications to a source code repository. In some embodiments, SCM techniques are employed to track a history of changes to a software code base and to resolve conflicts when merging updates from multiple software developers.

The continuous deployment module 114 manages the automatic release of software code changes made by one or more software developers from a software repository to a production environment, for example, after validating the stages of production have been completed. The continuous deployment module 114 may interact in some embodiments, with the software testing system 108 to coordinate the testing of software code and/or verify a successful testing of software code.

In at least some embodiments, the pipeline job simulation engine 116 may simulate one or more pipeline jobs of a software deployment pipeline, as discussed further below in conjunction with, for example, FIGS. 4 and 7. The pipeline job simulation engine 116 may incorporate virtualization aspects that allow a user to select a pipeline job for simulation in a simulated environment, as discussed further below.

In one or more embodiments, the job test/debug module 118 may include functionality for testing and/or debugging one or more pipeline jobs simulated by the pipeline job simulation engine 116, as discussed herein. The GUI module 120 may include functionality in some embodiments for the generation and interaction of, for example, a pipeline manager and a pipeline job test/debug module, as discussed further below in conjunction with FIGS. 3, 5 and 7, for example.

It is to be appreciated that this particular arrangement of elements 110, 112, 114, 116, 118 and/or 120 illustrated in the software development system 105 of the FIG. 1 embodiment is presented by way of example only, and alternative arrangements can be used in other embodiments. For example, the functionality associated with the elements 110, 112, 114, 116, 118 and/or 120 in other embodiments can be combined into a single module, or separated across a larger number of modules. As another example, multiple distinct processors can be used to implement different ones of the elements 110, 112, 114, 116, 118 and/or 120 or portions thereof.

At least portions of elements 110, 112, 114, 116, 118 and/or 120 may be implemented at least in part in the form of software that is stored in memory and executed by a processor.

The software testing system 108 comprises a testing module 122 that performs one or more software tests within a software deployment pipeline, as would be apparent to a person of ordinary skill in the art. Generally, software testing aims to ensure that bugs and other software code errors are detected as soon as possible and are remedied before being exposed to end-users. In some embodiments, the software testing system 108 performs pipeline-level testing, for example, in a virtualized environment.

It is to be appreciated that this particular arrangement of the module 122 illustrated in the software testing system 108 of the FIG. 1 embodiment is presented by way of example only, and alternative arrangements can be used in other embodiments. For example, the functionality associated with module 122 in other embodiments can be separated across a larger number of modules and/or multiple distinct processors can be used to implement the functionality associated with module 122, or portions thereof.

In at least some embodiments, the orchestration engine 130 may be implemented, at least in part, using the functionality of Kubernetes®, Docker Swarm®, AmazonEKS® (Elastic Kubernetes Service), AmazonECS® (Elastic Container Service), and/or PKS® (Pivotal Container Service).

In one or more embodiments, the orchestration engine 130 may create simulated environments using containers which provide a form of operating system virtualization. One container might be used to run a small microservice or a software process, as well as larger applications. The container provides the necessary executables, binary code, libraries, and configuration files. In some embodiments, the orchestration engine 130 may employ a PKS cluster (e.g., an enterprise Kubernetes platform) that enables developers to provision, operate and/or manage enterprise-level Kubernetes clusters to execute a simulated pipeline job. The Docker open-source containerization platform may be leveraged in some embodiments for building, deploying, and/or managing containerized applications. Docker enables developers to package applications into containers-standardized executable components that combine application source code with operating system libraries and dependencies required to run that code in any environment.

Additionally, the software development system 105 and/or the software testing system 108 can have at least one associated database 106 configured to store data pertaining to, for example, software code 107 of at least one application. For example, the at least one associated database 106 may correspond to at least one code repository that stores the software code 107. In such an example, the at least one code repository may include different snapshots or versions of the software code 107, at least some of which can correspond to different branches of the software code 107 used for different development environments (e.g., one or more testing environments, one or more staging environments, and/or one or more production environments).

Also, at least a portion of the one or more user devices 102 can also have at least one associated database (not explicitly shown in FIG. 1). As an example, such a database can maintain a particular branch of the software code 107 that is developed in a sandbox environment associated with a given one of the user devices 102, as discussed further below in conjunction with FIG. 6. Any changes associated with that particular branch can then be sent and merged with branches of the software code 107 maintained in the at least one database 106, for example.

An example database 106, such as depicted in the present embodiment, can be implemented using one or more storage systems associated with the software development system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the software development system 105 are one or more input-output devices, which illustratively comprise keyboards, displays or other types of input-output devices in any combination. Such input-output devices can be used, for example, to support one or more user interfaces to the software development system 105, as well as to support communication between software development system 105 and other related systems and devices not explicitly shown.

Additionally, the software development system 105, the software testing system 108 and/or the orchestration engine 130 in the FIG. 1 embodiment are assumed to be implemented using at least one processing device. Each such processing device generally comprises at least one processor and an associated memory, and implements one or more functional modules for controlling certain features of the software development system 105, the software testing system 108 and/or the orchestration engine 130.

More particularly, the software development system 105, the software testing system 108 and/or the orchestration engine 130 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the software development system 105, the software testing system 108 and/or the orchestration engine 130 to communicate over the network 104 with the user devices 102, and illustratively comprises one or more conventional transceivers.

It is to be understood that the particular set of elements shown in FIG. 1 for software development system 105 and the software testing system 108 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the software development system 105, the software testing system 108 and database(s) 106 can be on and/or part of the same processing platform.

Figure 2B:
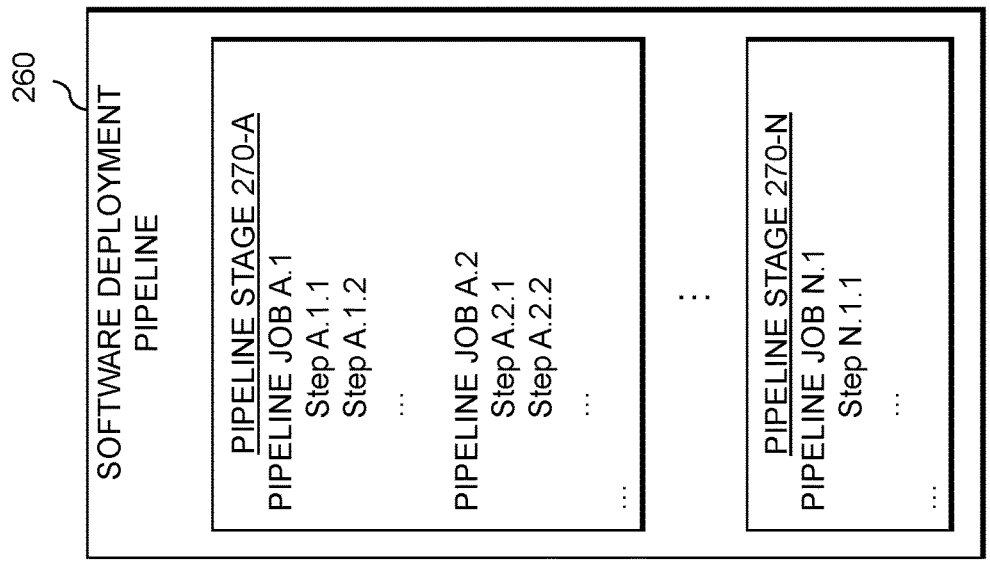
FIG. 2B shows an example of one or more pipeline jobs in various stages of a software deployment pipeline in an illustrative embodiment.
Figure 2A:
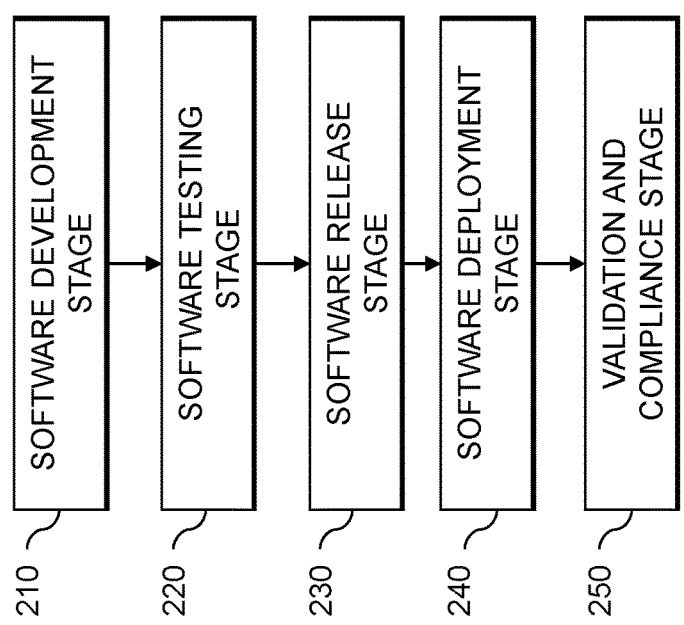
FIG. 2A shows an example of a software development lifecycle in an illustrative embodiment.

FIG. 2A shows an example of a software development lifecycle in an illustrative embodiment. A software development lifecycle is comprised of a number of stages 210 through 250. In the example of FIG. 2A, a software development stage 210 comprises generating (e.g., writing) the software code for a given application. A software testing stage 220 tests the application software code. A software release stage 230 comprises delivering the application software code to a repository. A software deployment stage 240 comprises deploying the application software code to a production environment. Finally, a validation and compliance stage 250 comprises the steps to validate a deployment, for example, based at least in part on the needs of a given organization. For example, image security scanning tools may be employed to ensure a quality of the deployed images by comparing them to known vulnerabilities, such as those known vulnerabilities in a catalog of common vulnerabilities and exposures (CVEs).

FIG. 2B shows an example of one or more pipeline jobs in various pipeline stages 270-A through 270-N (collectively, pipeline stages 270) of a software deployment pipeline 260 in an illustrative embodiment. The pipeline stages 270-A through 270-N of a software deployment pipeline 260 may correspond, for example, to the stages 210, 220, 230, 240 and 250 of the software development lifecycle of FIG. 2A.

In the example of FIG. 2B, each pipeline stage 270 is comprised of a plurality of pipeline jobs, such as pipeline jobs A.1 and A.2 for pipeline stage 270-A. Each pipeline job is comprised of one or more steps (e.g., tasks, scripts and/or a reference to an external template), such as steps A.1.1 and A. 1.2 of pipeline job A. 1 and steps A.2.1 and A.2.2 of pipeline job A.2.

In one or more embodiments, a pipeline can comprise one or more of the following elements: (i) local development environments (e.g., the computers of individual developers); (ii) a CI server (or a development server); (iii) one or more test servers (e.g., for functional user interface testing of the product); and (iv) a production environment. The pipelines may be defined, for example, in YAML (Yet Another Markup Language) with a set of commands executed in series to perform the necessary activities (e.g., the steps of each pipeline job).

Figure 3:
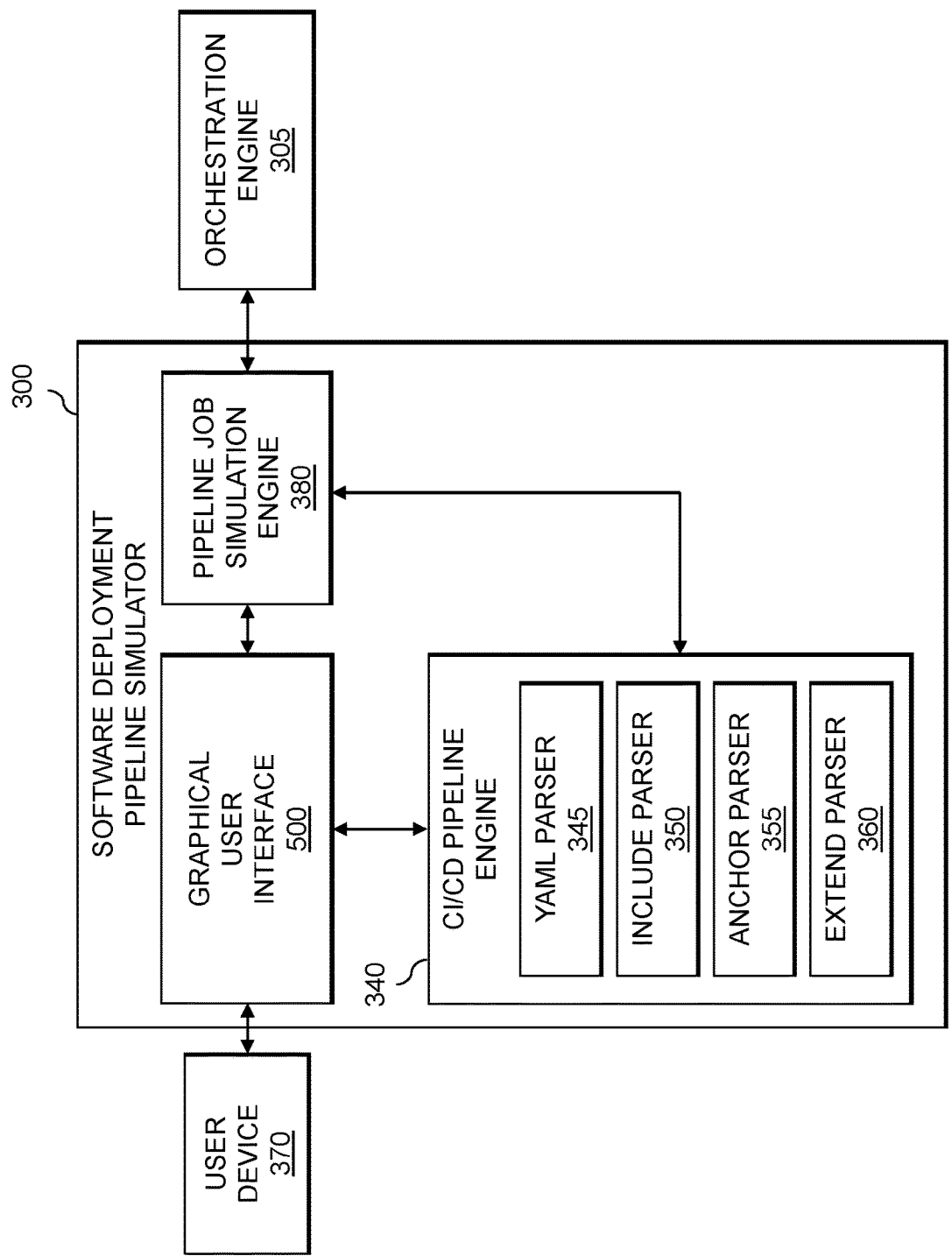
FIG. 3 illustrates a software deployment pipeline simulator configured for simulation of one or more pipeline jobs in a software deployment pipeline, in accordance with an illustrative embodiment.

FIG. 3 illustrates a software deployment pipeline simulator 300 configured for simulation of one or more pipeline jobs in a software deployment pipeline, in accordance with an illustrative embodiment. As shown in FIG. 3, the software deployment pipeline simulator 300 comprises a GUI 500, as discussed further below in conjunction with FIG. 5, a CI/CD pipeline engine 340 and a pipeline job simulation engine 380. FIG. 3 also shows orchestration engine 305, which is similar to orchestration engine 130 described above in connection with FIG. 1.

In addition, in at least some embodiments, a user employing a user device 370 utilizes the GUI 500 to interact with one or more visual representations of a software deployment pipeline or components thereof (e.g., pipeline jobs). Generally, the GUI 500 provides access to a visual software deployment pipeline editor, a pipeline manager, a DevOps toolkit and a reusable CI/CD resource library, as discussed further below.

As shown in FIG. 3, the exemplary CI/CD pipeline engine 340 comprises a YAML parser 345, an include parser 350, an anchor parser 355, and an extend parser 360. The YAML parser 345 processes top-level YAML files obtained from one or more DevOps collaboration tools, for example, for conversion into a renderable format, such as a JSON (JavaScript Object Notation) file format. The include parser 350 processes files referenced in include statements in the YAML file (e.g., whereby a first YAML file calls a second YAML file). The anchor parser 355 processes references in the YAML file, such as variables, images and other configuration items. The extend parser 360 is employed when an include statement specifies a defined job that a user would like to extend (e.g., to extend or otherwise customize a preconfigured job defined, for example, in a blueprint).

In the example of FIG. 3, the pipeline job simulation engine 380 interacts with the GUI 500 and the exemplary CI/CD pipeline engine 340 in order to simulate one or more pipeline jobs selected by the user using the user device 370 and the GUI 500, as discussed further below.

Figure 4:
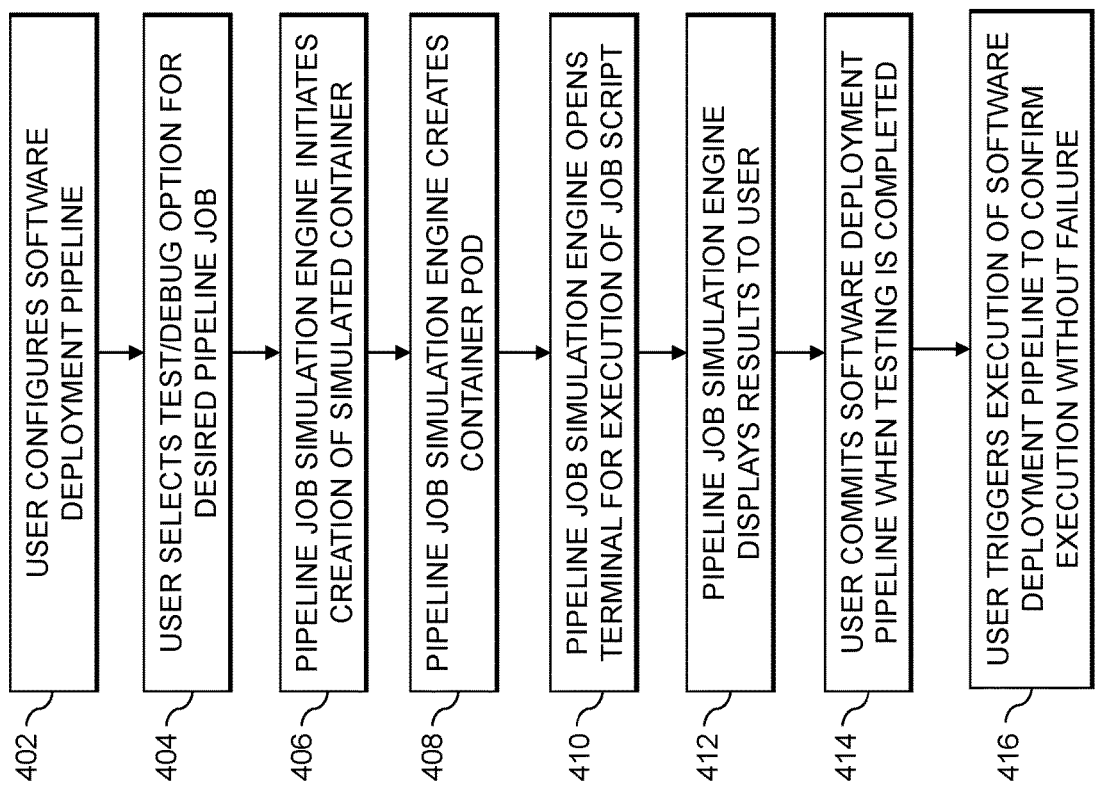
FIG. 4 is a flow chart illustrating a process for simulating one or more pipeline jobs in a software deployment pipeline, in accordance with an illustrative embodiment.

FIG. 4 is a flow chart illustrating a process for simulating one or more pipeline jobs in a software deployment pipeline, in accordance with an illustrative embodiment. In the example of FIG. 4, a user configures a software deployment pipeline in step 402, for example, using the software deployment pipeline generation techniques described in U.S. patent application Ser. No. 17/940,457, filed Sep. 8, 2022, (now U.S. Pat. No. 12,314,693), entitled "Visual Generation of Software Deployment Pipelines Using Recommendations of Development and Operations Blueprints," incorporated by reference herein in its entirety.

In step 404, the user selects a test/debug option for a desired pipeline job. The pipeline job simulation engine initiates a creation of a simulated container for the selected pipeline job in step 406.

The pipeline job simulation engine then creates a container pod for the simulated container, if needed, in step 408, and opens a terminal (e.g., a bash terminal) for the execution of the job script associated with the desired pipeline job in step 410. For example, for a Kubernetes environment, one or more containers can be part of a pod. Thus, the environment may be referred to, more generally, as a pod-based system, a pod-based container system, a pod-based container orchestration system, a pod-based container management system, or the like. Furthermore, a pod is typically considered the smallest execution unit in the Kubernetes container orchestration environment. A pod encapsulates one or more containers, and one or more pods can be executed on a worker node. Multiple worker nodes form a cluster. A Kubernetes cluster is managed by at least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Also, pods may each have persistent storage volumes associated therewith. Configuration information (configuration objects) indicating how a container executes can be specified for each pod.

In step 412, the pipeline job simulation engine displays the results of the execution of the desired pipeline job to the user, and the user commits the software deployment pipeline in step 414 when the testing is complete. In step 416, the user triggers an execution of the full software deployment pipeline to confirm an execution of the full software deployment pipeline without a failure (e.g., after the individual pipeline jobs of the software deployment pipeline have been tested and debugged).

Figure 5:
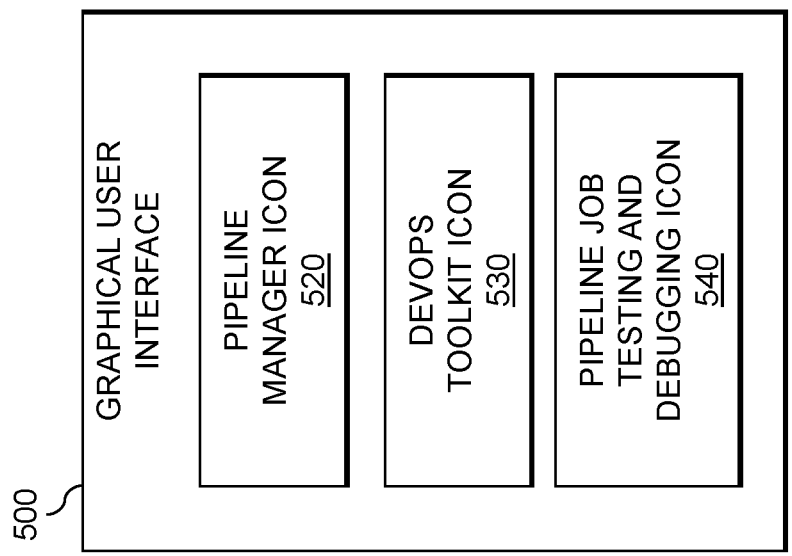
FIG. 5 illustrates the graphical user interface of FIG. 3 in further detail, in accordance with an illustrative embodiment.

FIG. 5 illustrates the graphical user interface 500 of FIG. 3 in further detail, in accordance with an illustrative embodiment. In the example of FIG. 5, the graphical user interface 500 comprises an icon 520 to access a pipeline manager, an icon 530 to access a DevOps toolkit and an icon 540 to access the disclosed pipeline job testing and debugging functionality.

The pipeline manager icon 520 (or another visual indication, such as a tab and/or a menu selection) may provide a user with visual access to functionality to perform pipeline operations, such as renaming, reordering, addition and/or deletion of pipeline stages, in coordination with the visual software deployment pipeline editor.

The DevOps toolkit icon 530 (or another visual indication, such as a tab and/or a menu selection) may provide a user with visual access to one or more tools provided, for example, by a DevOps collaboration toolkit.

The pipeline job testing and debugging icon 540 (or another visual indication, such as a tab and/or a menu selection) may provide a user with visual access to one or more pipeline jobs of a given software development pipeline, and allow the user to select at least one pipeline job to simulate using the disclosed simulation techniques. The simulation may be performed, for example, as part of a design (e.g., testing and debugging) of the given software development pipeline. For example, the pipeline job testing and debugging icon 540 may activate a visual interface that allows a user to select specific pipeline jobs to simulate and execute in a simulated environment. In addition, the pipeline job testing and debugging icon 540 may have associated functionality for presenting the results of a simulated pipeline job to the user (e.g., on a terminal).

In some embodiments, the graphical user interface 500 of FIG. 5 may be organized using tabs or another visual organization method to provide access to pipeline jobs, DevOps blueprints and images of virtual resources. A jobs tab, for example, may display representations of available pipeline jobs from the latest DevOps blueprints, optionally with multiple filters to search for pipeline jobs. Upon selecting a job tile for a particular pipeline job, for example, users can view the metadata associated with the corresponding pipeline job, such as a job description, supported languages, contributors, template data and scripts, and optionally launch a simulation of the particular pipeline job for purposes of testing and debugging.

A DevOps blueprint tab may display a list of available DevOps blueprints. By selecting a job tile for a particular DevOps blueprint, for example, users can view the pipeline stages of the particular DevOps blueprint and the corresponding pipeline jobs for each pipeline stage, for example, when the user wants to add or simulate pipeline jobs from a particular DevOps blueprint into the software deployment pipeline.

A DevOps images tab, for example, may present a catalogue of available DevOps docker images and provide for user discovery of DevOps images using software name and version information.

FIG. 6A and FIG. 6B show examples of a pipeline job 600 and a corresponding executable script 650, respectively, in accordance with illustrative embodiments. In the example of FIG. 6A, the exemplary pipeline job 600 comprises a compile job for a nodeJS server. The compile job defines a job script with one or more commands to be executed. Before a given job, the commands defined by a before_script key phrase are executed and generally this script will be used to load any software dependencies for running the given job, as shown in the corresponding executable script 650. The executable script 650 may be a shell script computer program (e.g., an .sh shell script), for example, that executes using a Unix shell. In the examples of FIGS. 6A and 6B, the before_script key phrase references a "karma-chrome-launcher" 3.1.1 version that is installed with the nodejs-devops images. The script section can be used to explicitly downgrade the version to 3.1.0 for any specific project dependencies, for example.

In a NodeJS example, an npm install command will install all software dependencies for the compile job. It is noted that npm is a package manager for JavaScript and serves as a default package manager for the JavaScript runtime environment of nodeJS.npm makes it easier to install and manage nodeJS tools and installs packages locally or globally and to manage dependencies. In addition, following a given job, one or more commands defined by an after_script key phrase are executed, as shown in the corresponding executable script 650. The image tag will have a docker image comprising libraries, tools and other files needed for an application to run.

The YAML file for a particular software deployment pipeline defines one or more jobs with constraints defining how and when the one or more jobs should be executed. The one or more jobs are defined in at least some embodiments as top-level elements with a name and a script keyword. The script and image configurations will be used by the disclosed pipeline simulator to execute the job in a simulated environment. As noted above, the before_script tag will be used to setup any dependencies which are required for job execution. The disclosed pipeline simulator generates a debugging container in some embodiments using the image configuration to test and execute any of the jobs or scripts to be executed at design time. The disclosed pipeline simulator typically executes the process of FIG. 8, discussed below, to simulate any selected pipeline jobs.

Figure 7:
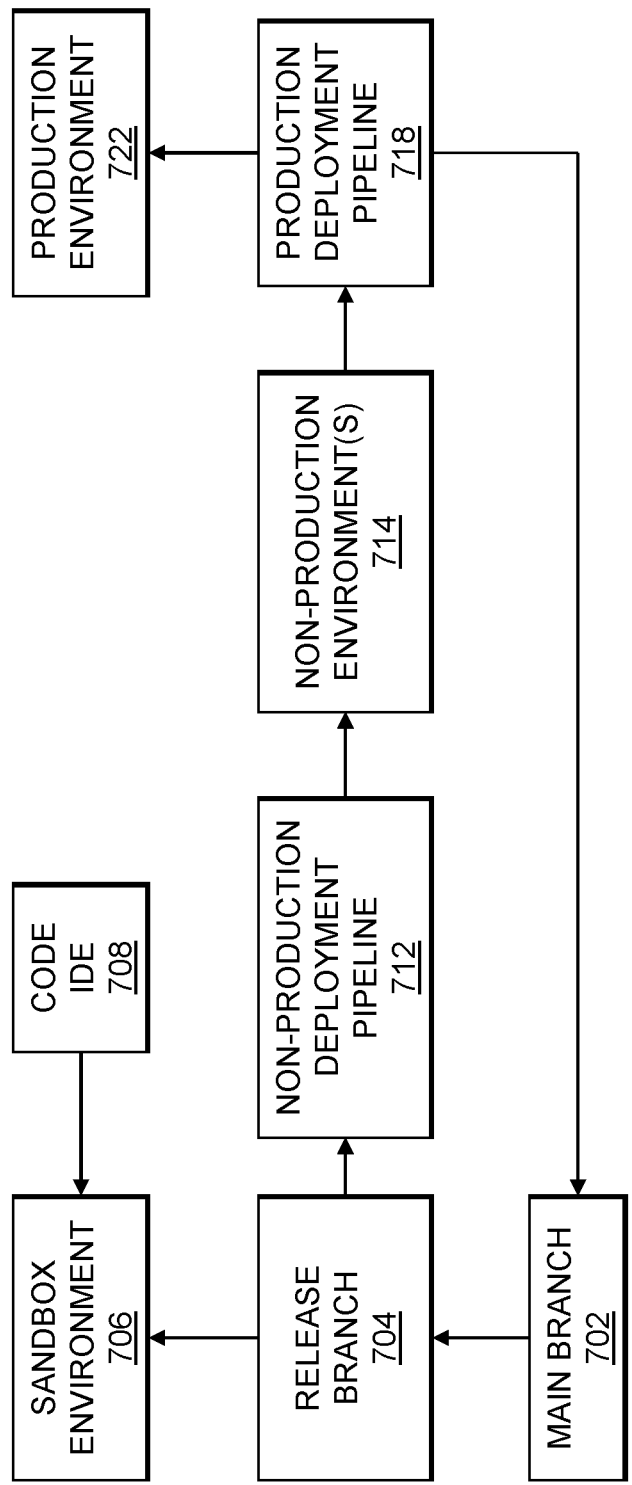
FIG. 7 shows an example of at least portions of the software development lifecycle of FIG. 2A in further detail, in accordance with an illustrative embodiment.

FIG. 7 shows an example of at least portions of the software development lifecycle of FIG. 2A in further detail in an illustrative embodiment. In the FIG. 7 example, a main branch 702 corresponds to software code of at least one software application. A release branch 704 is created based on the main branch 702. For example, the release branch 704 may be created based on development release timelines corresponding to the software application.

One or more developers (e.g., corresponding to user devices 102) create respective personal branches based on the release branch 704, and perform development work using a sandbox environment 706 and a code IDE (integration development environment) 708. Many developers prefer to write software code using such an IDE that allows the software to be developed in any programming language without having to deal with a particular language syntax. Developers may have multiple IDEs available for application development but there is currently no IDE available for writing software deployment pipeline code.

Developers can commit the changes made in their personal branches to the release branch 704. In the FIG. 7 example, a non-production deployment pipeline 712 is triggered according to one or more specified schedules. The non-production deployment pipeline 712 deploys any changes resulting from the change requests to one or more non-production environments 714.

In some examples, the non-production environment(s) 714 may include one or more of: a developer integration testing (DIT) environment, a system integration testing (SIT) environment, and a global environment. As noted above, the non-production deployment pipeline 712 may be triggered according to schedules defined for each of the non-production environments 714 (e.g., a first schedule for a DIT environment and a second schedule for an SIT environment).

A production deployment pipeline 718 can be triggered when the release branch 704 of the application is ready to be deployed to a production environment 722. Generally, the production deployment pipeline 718 collects any changes that were made to the release branch 704, creates a deployment package, and deploys the package to the production environment 722.

Figure 8:
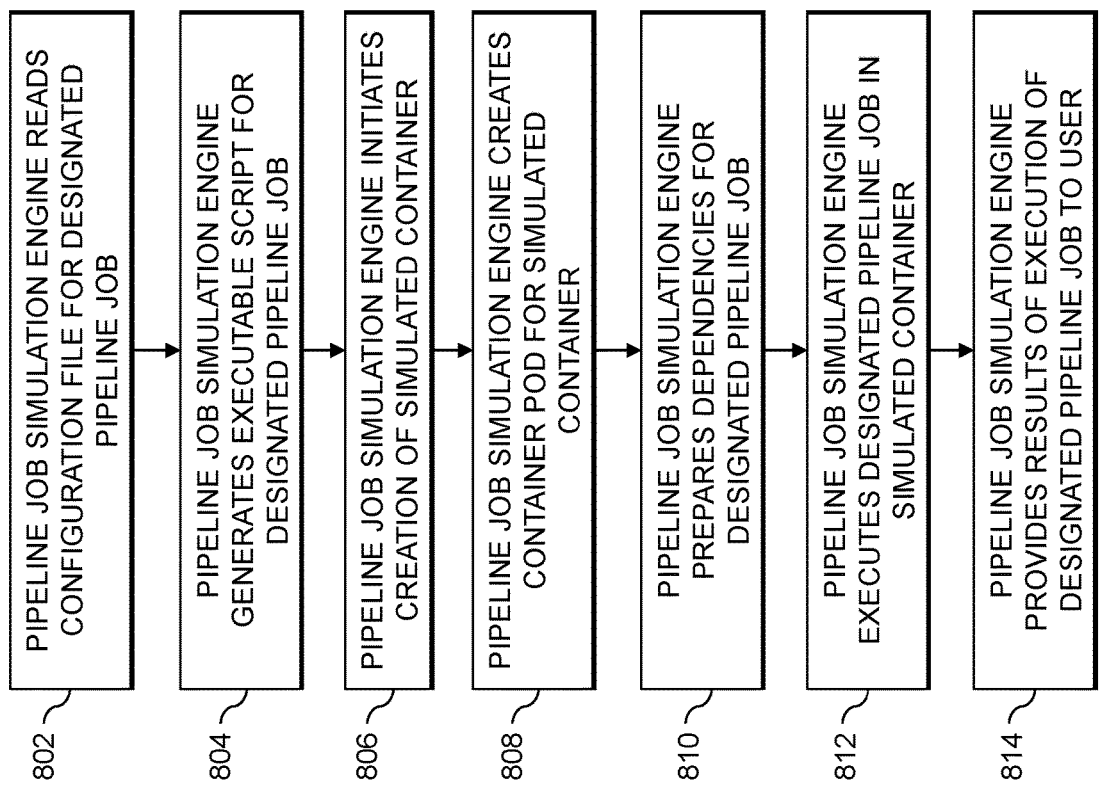
FIGS. 8 and 9 are flow charts illustrating respective processes for simulating one or more pipeline jobs in a software deployment pipeline, in accordance with illustrative embodiments.

FIG. 8 is a flow chart illustrating a process for simulating one or more pipeline jobs in a software deployment pipeline, in accordance with an illustrative embodiment. In the example of FIG. 8, the pipeline job simulation engine reads a configuration file (e.g., a YAML file) for a designated pipeline job in step 802. In the case of a YAML file, there are a number of available frameworks to serialize and de-serialize the YAML file for many programming languages. For example, the pipeline job simulation engine may create a C #web application programming interface (API) to read the YAML file into a machine-readable format.

In step 804, the pipeline job simulation engine generates an executable script for the designated pipeline job. As noted above, the pipeline job simulation engine may convert the designated pipeline job to an executable script (e.g., an .sh script) that can run in any container in at least some embodiments. The pipeline job simulation engine may process the script, the before-script and the after-script tags from the YAML configuration file for the software deployment pipeline to generate the executable script.

The pipeline job simulation engine initiates a creation of a simulated container in step 806 and creates a container pod for the simulated container, if needed, in step 808, as described above. The container can be created from one or more images associated with the designated pipeline job. For example, a docker container create command can create a new container from the specified image, without starting the container. The pipeline job simulation engine can use the docker commands and create the debugging container using the image configured in the YAML file for the designated pipeline job. In at least some embodiments, a container will act as a normal operating system process except that this process is isolated and has its own file system, its own networking, and its own isolated process tree separate from the host and it also has libraries and packages installed in the container based on the script that is generated.

In step 810, the pipeline job simulation engine prepares any software dependencies for the designated pipeline job. The pipeline job simulation engine may prepare and install the software dependencies that are mentioned in the before_script section of the YAML file for the designated pipeline job. In addition, any additional custom package dependencies that are not part of the image can be explicitly installed in the before_script section as shown in the example of FIG. 6B.

The pipeline job simulation engine executes the designated pipeline job in the simulated container in step 812. For example, the pipeline job simulation engine may push the generated script to the created container shell and execute the script. In step 814, the pipeline job simulation engine provides any results of the execution of the designated pipeline job to the user (for example, using the interactive terminal). The pipeline job simulation engine may obtain the results from the shell after the execution of the script and provide Success/Fail results for a given simulated pipeline job (or portion thereof) to the user.

The process of FIG. 8 may be performed, for example, each time a developer triggers the simulation of a given pipeline job. During the debug process, developers or other users can update the YAML file to modify one or more configuration settings of the given pipeline job, without any commit of the software deployment pipeline to the GIT repository, for example. The pipeline job simulation engine may take job configurations from the local instance of the software deployment pipeline so that updated configurations will be taken for job executions.

Figure 9:
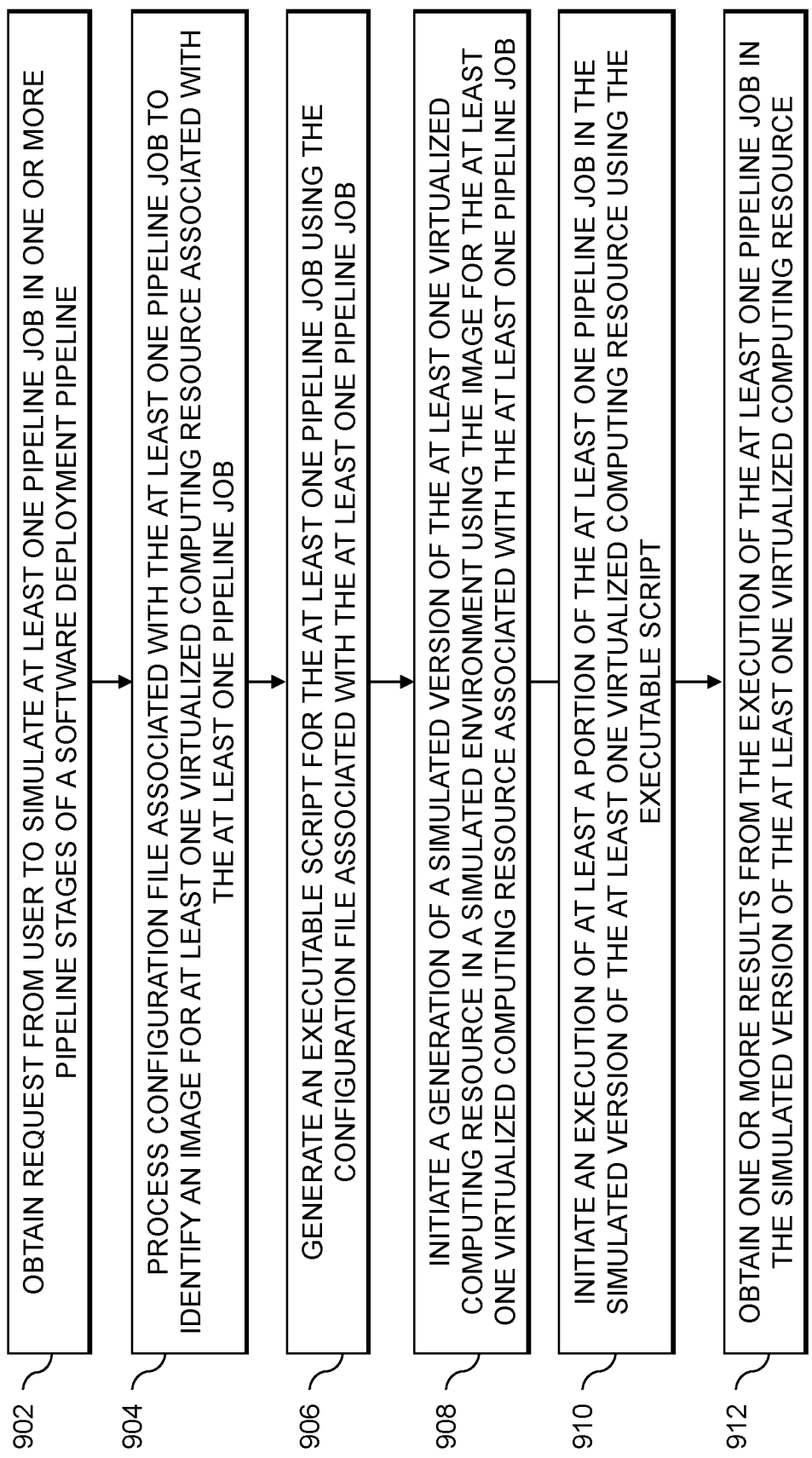

FIG. 9 is a flow chart illustrating a process for simulating one or more pipeline jobs in a software deployment pipeline, in accordance with an illustrative embodiment. In the example of FIG. 9, a request is obtained in step 902 from a user to simulate at least one pipeline job in one or more pipeline stages of a software deployment pipeline. In step 904, a configuration file associated with the at least one pipeline job is processed to identify an image for at least one virtualized computing resource associated with the at least one pipeline job. In step 906, an executable script for the at least one pipeline job is generated using the configuration file associated with the at least one pipeline job.

In step 908, the process initiates a generation of a simulated version of the at least one virtualized computing resource in a simulated environment using the image for the at least one virtualized computing resource associated with the at least one pipeline job. In step 910, the process initiates an execution of at least a portion of the at least one pipeline job in the simulated version of the at least one virtualized computing resource using the executable script.

One or more results are obtained in step 912 from the execution of the at least one pipeline job in the simulated version of the at least one virtualized computing resource.

In one or more embodiments, a graphical user interface is provided to present a visual representation of at least some of the at least one pipeline job in the one or more pipeline stages of the software deployment pipeline to the user for selection of a given pipeline job to simulate. The configuration file associated with the at least one pipeline job may be processed to identify one or more software dependencies for an execution of the at least one pipeline job; and the one or more identified software dependencies for the execution of the at least one pipeline job may be installed in the simulated version of the at least one virtualized computing resource using the executable script.

In some embodiments, at least a portion of the at least one pipeline job is debugged using the one or more results from the execution of the at least one pipeline job. The execution of the at least the portion of the at least one pipeline job in the simulated version of the at least one virtualized computing resource may comprise executing the at least one pipeline job in its entirety and/or executing one or more indicated lines of the at least one pipeline job. In addition, an interactive terminal may be provided for the user to interact with the execution of the at least the portion of the at least one pipeline job in the simulated version of the at least one virtualized computing resource. One or more designated breakpoints in the at least one pipeline job may be processed to halt the execution of at least one pipeline job. It is noted that breakpoints allow developers to stop execution of a simulated pipeline job and to evaluate the required details (e.g., values of one or more variables) of the simulated pipeline job. Thus, such breakpoints provide an important debugging technique for developers to remedy issues that are detected with respect to one or more simulated pipeline jobs.

The particular processing operations and other network functionality described in conjunction with the flow diagrams of FIGS. 2A, 4 and 7 through 9, for example, are presented by way of illustrative example only, and should not be construed as limiting the scope of the disclosure in any way. Alternative embodiments can use other types of processing operations to provide functionality for simulation of one or more pipeline jobs. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

It should also be understood that the disclosed techniques for simulation of one or more pipeline jobs in a software deployment pipeline can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for simulation of one or more pipeline jobs may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services and/or storage services can be offered to cloud infrastructure tenants or other system users as a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based graphical software deployment pipeline job simulation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a graphical software deployment pipeline job simulation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container. The containers may run on virtual machines in a multi-tenant environment, although other arrangements are possible. The containers may be utilized to implement a variety of different types of functionalities within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
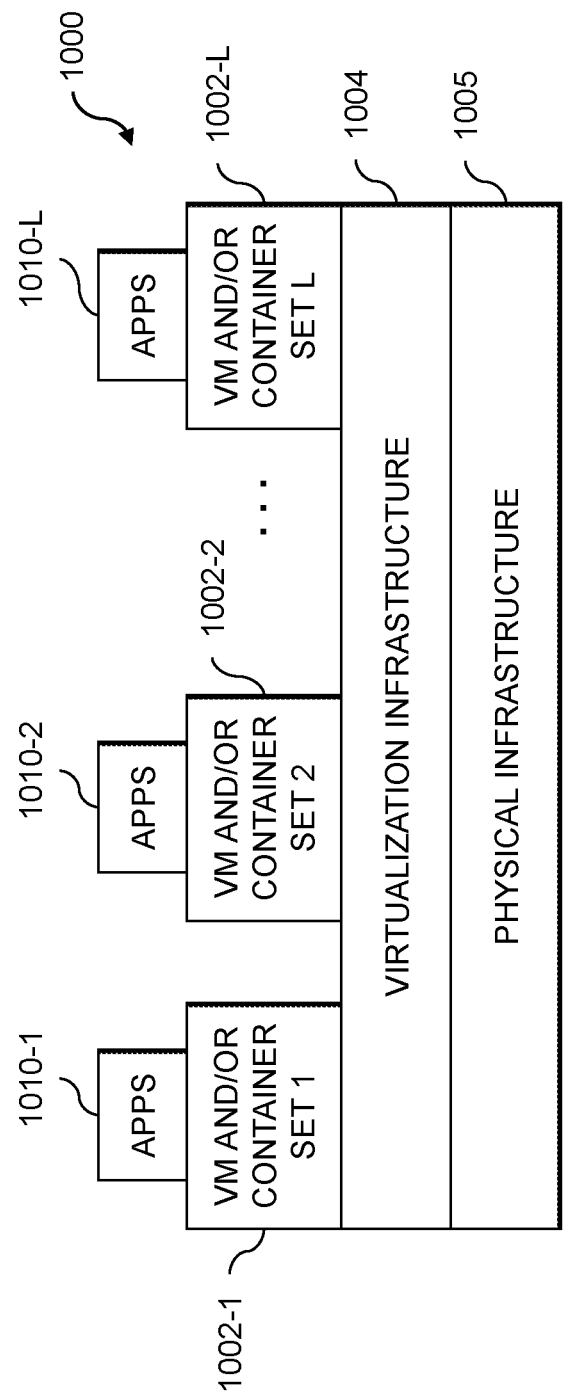
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple VMs and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide graphical software deployment pipeline job simulation functionality of the type described above for one or more processes running on a given one of the VMs. For example, each of the VMs can implement graphical software deployment pipeline job simulation control logic and associated software deployment pipeline recommendation functionality for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide graphical software deployment pipeline job simulation functionality of the type described above for one or more processes running on different ones of the containers. For example, a container host device supporting multiple containers of one or more container sets can implement one or more instances of graphical software deployment pipeline job simulation control logic and associated software deployment pipeline recommendation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a WAN, a LAN, a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an ASIC, an FPGA or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
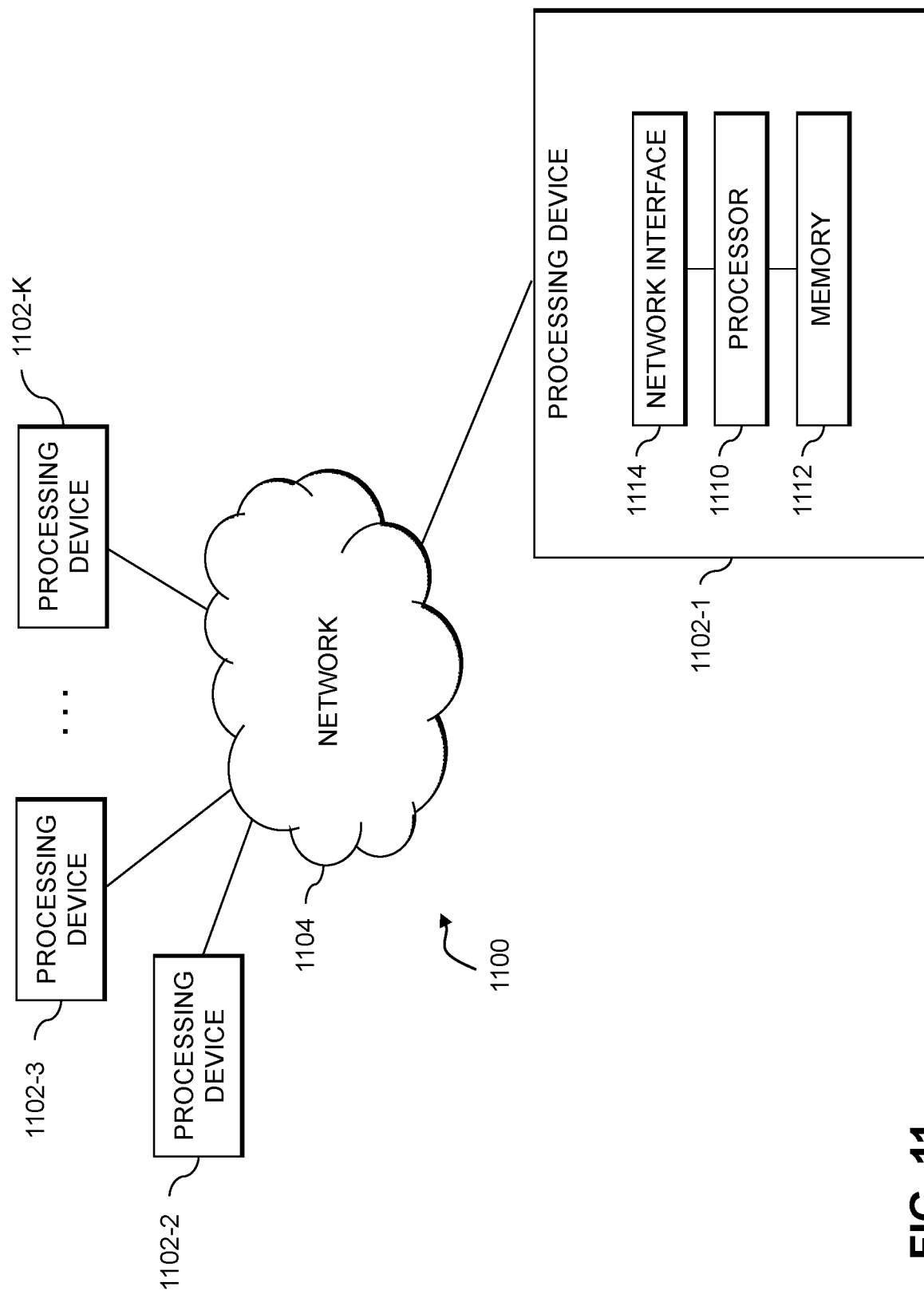
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a request from a user to simulate at least one pipeline job in one or more pipeline stages of a software deployment pipeline, wherein the request is obtained during a design phase of at least one of the one or more pipeline stages of the software deployment pipeline;
    processing a configuration file associated with the at least one pipeline job to identify an image for at least one virtualized computing resource associated with the at least one pipeline job;
    generating an executable script for the at least one pipeline job using the configuration file associated with the at least one pipeline job;
    generating, using the image for the at least one virtualized computing resource associated with the at least one pipeline job, during the design phase, a simulated version of the at least one virtualized computing resource in a simulated environment, wherein the simulated environment is distinct from a production environment where at least a portion of the software deployment pipeline executes at run-time;
    executing, using the executable script, during the design phase, a subset of lines, indicated by a user using an interactive terminal, of the at least one pipeline job in the simulated version of the at least one virtualized computing resource, wherein the indicated subset of lines of the at least one pipeline job comprises less than all lines of the at least one pipeline job;
    processing one or more designated breakpoints in the at least one pipeline job to halt the execution of the indicated subset of lines of the at least one pipeline job in accordance with the one or more designated breakpoints to evaluate a value of at least one variable; and
    providing one or more results, from the execution of the indicated subset of lines of the at least one pipeline job in the simulated version of the at least one virtualized computing resource, to the user in the interactive terminal to identify and correct one or more errors in the at least one pipeline job;
    wherein the method is performed by at least one processing device comprising a processor coupled to a memory.

2. The method of claim 1, further comprising providing a graphical user interface to present a visual representation of at least some of the at least one pipeline job in the one or more pipeline stages of the software deployment pipeline to the user for selection of a given pipeline job to simulate.

3. The method of claim 2, wherein the selection, using the graphical user interface, of the given pipeline job to simulate further comprises executing the given pipeline job in the simulated environment.

4. The method of claim 1, further comprising initiating a debugging of at least a portion of the at least one pipeline job using the one or more results from the execution of the subset of lines of the at least one pipeline job.

5. The method of claim 1, wherein the execution of the subset of lines of the at least one pipeline job in the simulated version of the at least one virtualized computing resource comprises executing the at least one pipeline job in its entirety.

6. The method of claim 1, further comprising providing the interactive terminal for the user to interact with the execution of the subset of lines of the at least one pipeline job in the simulated version of the at least one virtualized computing resource.

7. The method of claim 1, further comprising processing the configuration file associated with the at least one pipeline job to identify one or more software dependencies for an execution of the at least one pipeline job; and installing the one or more identified software dependencies for the execution of the at least one pipeline job in the simulated version of the at least one virtualized computing resource using the executable script.

8. An apparatus comprising:
   at least one processing device comprising a processor coupled to a memory;
   the at least one processing device being configured to implement the following steps:
   obtaining a request from a user to simulate at least one pipeline job in one or more pipeline stages of a software deployment pipeline, wherein the request is obtained during a design phase of at least one of the one or more pipeline stages of the software deployment pipeline;
   processing a configuration file associated with the at least one pipeline job to identify an image for at least one virtualized computing resource associated with the at least one pipeline job;
   generating an executable script for the at least one pipeline job using the configuration file associated with the at least one pipeline job;
   generating, using the image for the at least one virtualized computing resource associated with the at least one pipeline job, during the design phase, a simulated version of the at least one virtualized computing resource in a simulated environment, wherein the simulated environment is distinct from a production environment where at least a portion of the software deployment pipeline executes at run-time;
   executing, using the executable script, during the design phase, a subset of lines, indicated by a user using an interactive terminal, of the at least one pipeline job in the simulated version of the at least one virtualized computing resource, wherein the indicated subset of lines of the at least one pipeline job comprises less than all lines of the at least one pipeline job;
   processing one or more designated breakpoints in the at least one pipeline job to halt the execution of the indicated subset of lines of the at least one pipeline job in accordance with the one or more designated breakpoints to evaluate a value of at least one variable; and
   providing one or more results, from the execution of the indicated subset of lines of the at least one pipeline job in the simulated version of the at least one virtualized computing resource, to the user in the interactive terminal to identify and correct one or more errors in the at least one pipeline job.

9. The apparatus of claim 8, further comprising providing a graphical user interface to present a visual representation of at least some of the at least one pipeline job in the one or more pipeline stages of the software deployment pipeline to the user for selection of a given pipeline job to simulate.

10. The apparatus of claim 8, further comprising initiating a debugging of at least a portion of the at least one pipeline job using the one or more results from the execution of the subset of lines of the at least one pipeline job.

11. The apparatus of claim 8, wherein the execution of the subset of lines of the at least one pipeline job in the simulated version of the at least one virtualized computing resource comprises executing the at least one pipeline job in its entirety.

12. The apparatus of claim 8, further comprising providing an interactive terminal for the user to interact with the execution of the subset of lines of the at least one pipeline job in the simulated version of the at least one virtualized computing resource.

13. The apparatus of claim 8, further comprising processing the configuration file associated with the at least one pipeline job to identify one or more software dependencies for an execution of the at least one pipeline job; and installing the one or more identified software dependencies for the execution of the at least one pipeline job in the simulated version of the at least one virtualized computing resource using the executable script.

14. A non-transitory processor-readable storage medium having stored therein program code of one or more software programs, wherein the program code when executed by at least one processing device causes the at least one processing device to perform the following steps:
   obtaining a request from a user to simulate at least one pipeline job in one or more pipeline stages of a software deployment pipeline, wherein the request is obtained during a design phase of at least one of the one or more pipeline stages of the software deployment pipeline;
   processing a configuration file associated with the at least one pipeline job to identify an image for at least one virtualized computing resource associated with the at least one pipeline job;
   generating an executable script for the at least one pipeline job using the configuration file associated with the at least one pipeline job;
   generating, using the image for the at least one virtualized computing resource associated with the at least one pipeline job, during the design phase, a simulated version of the at least one virtualized computing resource in a simulated environment, wherein the simulated environment is distinct from a production environment where at least a portion of the software deployment pipeline executes at run-time;
   executing, using the executable script, during the design phase, a subset of lines, indicated by a user using an interactive terminal, of the at least one pipeline job in the simulated version of the at least one virtualized computing resource, wherein the indicated subset of lines of the at least one pipeline job comprises less than all lines of the at least one pipeline job;
   processing one or more designated breakpoints in the at least one pipeline job to halt the execution of the indicated subset of lines of the at least one pipeline job in accordance with the one or more designated breakpoints to evaluate a value of at least one variable; and
   providing one or more results, from the execution of the indicated subset of lines of the at least one pipeline job in the simulated version of the at least one virtualized computing resource, to the user in the interactive terminal to identify and correct one or more errors in the at least one pipeline job.

15. The non-transitory processor-readable storage medium of claim 14, further comprising providing a graphical user interface to present a visual representation of at least some of the at least one pipeline job in the one or more pipeline stages of the software deployment pipeline to the user for selection of a given pipeline job to simulate.

16. The non-transitory processor-readable storage medium of claim 15, wherein the selection, using the graphical user interface, of the given pipeline job to simulate further comprises executing the given pipeline job in the simulated environment.

17. The non-transitory processor-readable storage medium of claim 14, further comprising initiating a debugging of at least a portion of the at least one pipeline job using the one or more results from the execution of the subset of lines of the at least one pipeline job.

18. The non-transitory processor-readable storage medium of claim 14, wherein the execution of the subset of lines of the at least one pipeline job in the simulated version of the at least one virtualized computing resource comprises executing the at least one pipeline job in its entirety.

19. The non-transitory processor-readable storage medium of claim 14, further comprising providing an interactive terminal for the user to interact with the execution of the subset of lines of the at least one pipeline job in the simulated version of the at least one virtualized computing resource.

20. The non-transitory processor-readable storage medium of claim 14, further comprising processing the configuration file associated with the at least one pipeline job to identify one or more software dependencies for an execution of the at least one pipeline job; and installing the one or more identified software dependencies for the execution of the at least one pipeline job in the simulated version of the at least one virtualized computing resource using the executable script.

* * * * *